United States Patent [19]

Smith

[11] Patent Number: 5,878,224
[45] Date of Patent: Mar. 2, 1999

[54] SYSTEM FOR PREVENTING SERVER OVERLOAD BY ADAPTIVELY MODIFYING GAP INTERVAL THAT IS USED BY SOURCE TO LIMIT NUMBER OF TRANSACTIONS TRANSMITTED BY SOURCE TO SERVER

[75] Inventor: Donald Edward Smith, Little Silver, N.J.

[73] Assignee: Bell Communications Research, Inc., Morristown, N.J.

[21] Appl. No.: 846,393

[22] Filed: Apr. 30, 1997

Related U.S. Application Data

[60] Provisional application No. 60/018,308 May 24, 1996 and provisional application 60/018,337 May 24, 1996.

[51] Int. Cl.$^6$ .................................................. G06F 13/00
[52] U.S. Cl. ................................................ 395/200.54
[58] Field of Search ................ 395/200.54, 200.65, 395/200.68, 280, 200.62, 200.63, 200.64; 370/236, 253, 501; 379/113, 196

[56] References Cited

U.S. PATENT DOCUMENTS

| | | | |
|---|---|---|---|
| 4,974,256 | 11/1990 | Cyr et al. | 379/113 |
| 5,067,074 | 11/1991 | Farel et al. | 395/200.65 |
| 5,103,446 | 4/1992 | Fischer | 370/236 |
| 5,367,523 | 11/1994 | Chang et al. | 370/235 |
| 5,377,327 | 12/1994 | Jain et al. | 395/200.65 |
| 5,400,329 | 3/1995 | Tokura et al. | 370/232 |
| 5,457,687 | 10/1995 | Newman | 370/232 |
| 5,491,801 | 2/1996 | Jain et al. | 395/200.71 |
| 5,581,610 | 12/1996 | Hooshiari | 379/133 |
| 5,633,859 | 5/1997 | Jain et al. | 370/234 |
| 5,633,861 | 5/1997 | Hanson et al. | 370/232 |
| 5,668,951 | 9/1997 | Jain et al. | 395/200.65 |
| 5,675,742 | 10/1997 | Jain et al. | 395/200.65 |

OTHER PUBLICATIONS

"A Dynamic Load Balancing Policy With a Central Job Dispatcher (LBC)", Distributed Computing Systems 1991 International Conference, IEEE, 1991, pp. 264–271, LIN—Raghavendra.

"Load Distributing for Locally Distributed Systems", IEEE, Dec. 1992, pp. 33–44,—Shivaratri, Krueger & Singhal.

*Primary Examiner*—Moustafa M. Meky
*Attorney, Agent, or Firm*—Joseph Giordano; David A. Hey; Loria B. Yeadon

[57] ABSTRACT

An apparatus and method for preventing overload of a network server by messages received from a source initiating network server transactions. The method and apparatus use available network traffic measurements to estimate target transaction rates and admission factors. The method includes the steps, executed by a processor, of establishing a target incoming transaction workload per measurement interval (602), estimating from measurements obtained during the measurement interval the transaction workload offered by a source (604), and reducing a rate at which new transactions are initiated by the source to match the incoming transaction workload to the target workload when the offered transaction workload exceeds a threshold (606).

4 Claims, 7 Drawing Sheets

SYSTEM FOR PREVENTING SERVER OVERLOAD BY ADAPTIVELY MODIFYING GAP INTERVAL THAT IS USED BY SOURCE TO LIMIT NUMBER OF TRANSACTIONS TRANSMITTED BY SOURCE TO SERVER

RELATED APPLICATIONS

This application is a continuation of provisional U.S. Patent Application Serial Nos. 60/018,308 and 60/018,337, both filed May 24, 1996.

BACKGROUND OF THE INVENTION

The present invention relates to telecommunication networks, and more particularly to systems and methods for controlling network server message flow to prevent server overload.

Telecommunications services are coming to rely more and more on real time network servers. In the traditional telephony arena, Service Control Points (SCPs) have been translating "freephone" numbers (800 numbers in the U.S.A.) into real telephone numbers for years. SCPs will soon support a range of intelligent network services, such as voice activated dialing, local number portability, calling name delivery and other screening features, automated telephone polling, and personal communications services. These services increase the demand on SCPs and require SCPs to handle transactions that vary widely in the number of messages per transaction and their real time costs. An analogue of the SCP for video dial tone services is a Level 1 Gateway. In a video dial tone network a Level 1 Gateway screens video session requests and instructs other network elements to set up connections. Level 1 Gateways also handle multiple transaction types, e.g., session requests for interactive TV and for pay-per-view events.

Service demand volatility threatens the integrity of the services that such network servers provide. In an environment of rapid service introduction, ordinary traffic engineering may not keep pace with the growth and fluctuations in load placed on network servers. The servers may experience occasional or even frequent overloads. Overload controls must therefore complement engineering practices.

Prior art controllers implement a trial and error search to establish proper control values relating measurements taken by the controller to server workload capacity. Examples of such measurements include the number of messages that flow into the server, the number of messages that encounter excessive response times, and processor utilization.

The prior art search algorithms suffer from two major limitations. First, the search algorithms update control parameters on a much longer time scale than arriving transactions (seconds vs. a few milliseconds). As a result, convergence of the total transaction rate to a desired value can be slow.

Second, some of the measurements the server uses to trigger controls, such as the number of incoming messages and the number of messages encountering excessive delay, are difficult to relate to the server workload capacity. For example, the amount of time the server needs to process a message varies considerably, so the number of incoming messages alone does not indicate the load on the server. Similarly, when messages encounter excessive delay, it is not obvious how to use counts of such messages to take control actions, especially when transactions span multiple measurement intervals.

When a server determines that it is in overload, it must instruct traffic sources to reduce the number of new transactions to the server. A source is a logical grouping of transactions; one source is the smallest stream of translations subject to a single overload control request. Present controllers in SCPs tightly couple the way servers specify the amount of traffic reduction to a technique for reducing traffic.

SCPs block incoming calls with Automatic Code Gapping ("ACG"), illustrated in FIG. 1. In ACG, the source blocks all new transactions 1 that occur during a gap interval 3. When the gap interval has finished, the next incoming new transaction, 5, 6, or 7, will be accepted. Immediately following the acceptance of the new transaction, the next gap interval begins. Thus, an ACG request to a source tells it to initiate at most one new transaction per "g" seconds, where g is the gap interval.

Conventional gapping techniques store predetermined tables of gap intervals at the sources. In response to congestion, the server transmits to the source an "overload level," an index into the table. The source then applies the gap corresponding to the overload level.

A limitation of this type of controller is that the fixed list of values may not contain the proper control values necessary to remedy a given server overload condition. A controller that is restricted to selecting a control value from a fixed list exhibits characteristic oscillations in transaction throughput as the server alternately selects overload levels that are too large and too small. The larger the mismatch between the values on the fixed list and the values actually needed to control the overload, the larger the swings in throughput. The frequency of the oscillations is governed by the length of the measurement interval, since the controller picks a new value from the list once per interval.

Conventional gapping techniques tend to yield less than optimal throughput because they tend to turn traffic on and then off for too long. Additionally, because applying conventional gapping the server transmits the same indices to all the sources of a given service type, large, high traffic sources tend to be throttled more severely than low traffic sources.

There is, therefore, a need for a method of controlling message flow to prevent server overload that overcomes the limitations of conventional techniques. For example, network server overload controllers should reduce the load incoming to the server to the maximum level it can comfortably handle. In a multi-service environment, a controller should also block demands for individual services provided by the network server.

DESCRIPTION OF THE INVENTION

The present invention overcomes the limitations of conventional techniques by implementing a method for preventing overload of a network server by messages received from a source initiating a network server transaction. The method includes the steps, executed by a processor, of establishing a target incoming transaction workload per measurement interval, estimating from measurements obtained during the measurement interval the transaction workload offered by a source, and reducing a rate at which new transactions are initiated by the source to match the incoming transaction workload to the target workload when the offered transaction workload exceeds a threshold.

The invention also comprises an apparatus for preventing overload of a network server by messages received from a source initiating a network server transaction. The apparatus includes structure for establishing a target incoming transaction workload per measurement interval, structure for estimating from measurements obtained during the measurement interval an incoming transaction workload offered by a source, and structure for reducing a rate at which new transactions are initiated by the source to match the target incoming transaction workload when the offered transaction workload exceeds a threshold.

Both the foregoing general description and the following detailed description are exemplary and explanatory and are intended to provide further explanation of the invention as claimed.

BRIEF DESCRIPTION OF THE DRAWINGS

The accompanying drawings provide a further understanding of the invention. They illustrate embodiments of the invention and, together with the description, explain the principles of the invention.

BEST MODE FOR CARRYING OUT THE INVENTION

Figure 1:
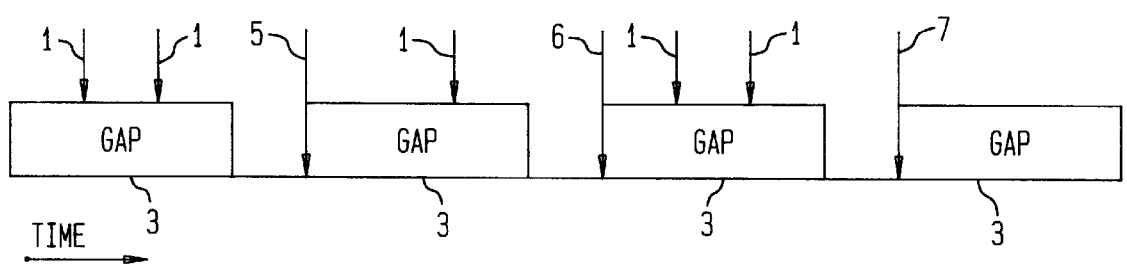
FIG. 1 is a diagram of transaction and gap intervals.
Figure 2:
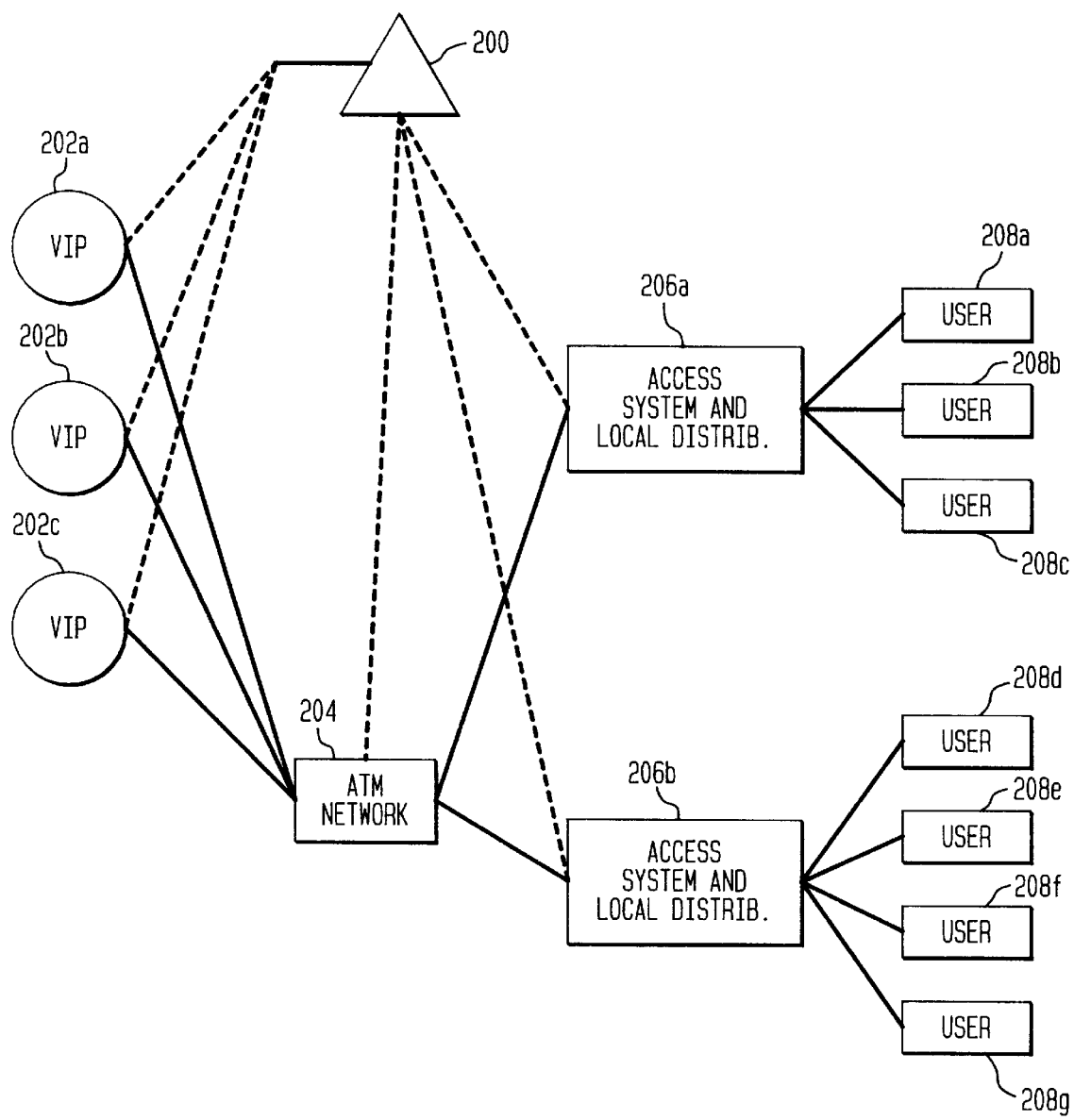
FIG. 2 is a block diagram of a video dial tone network.

The present invention can be implemented in a variety of telecommunication networks including, for example, video dial-tone networks. FIG. 2 is a block diagram of such a video dial-tone network. As shown, a video dial-tone network typically includes a Level 1 gateway 200, video information providers ("VIPs") 202a–c, an ATM network 204, and access system and local distribution facilities 206a–b. Users 208a–g connect to the network via access system and local distribution facilities 206a–b. In FIG. 2, solid lines represent ATM connections while broken lines represent control signal connections.

Level 1 Gateway 200 plays the role of network server in a video dial tone network. The Level 1 Gateway manages network sessions. It determines whether a given video information user 208a–g may connect to video information providers 202a–c or vice-versa. An example of such a session may be a video on demand viewing or a pay-per-view event. If the user is authorized to make the desired connection, then Level 1 Gateway 200 confirms with user 208a and provider 202a that they agree to engage in a session. Level 1 Gateway 200 then issues orders to ATM network 204 to allocate logical paths and bandwidth for the connection. At each stage of session setup, Level 1 Gateway 200 records the status of the video service provided by the network and the network connections.

Thus, to enable a video session setup, several messages must be communicated between network elements including a set top box, the video information provider, and ATM switches. Through ATM network 204 and access system and local distribution facilities 206a–b, Level 1 Gateway 200 mediates this exchange of messages. If any of the messages involved in session setup fails to reach its destination, the session will not be established.

An embodiment of the controller of the present invention prevents network servers such as Level 1 gateway 200 from overload caused by messages sent to it for processing video dial-tone network services. The controller seeks a target rate for the aggregate transaction stream caused by users initiating video service requests and computes admission factors that specify the fraction of new transactions that sources such as access system and local distribution 206a–b should admit for processing.

Figure 3:
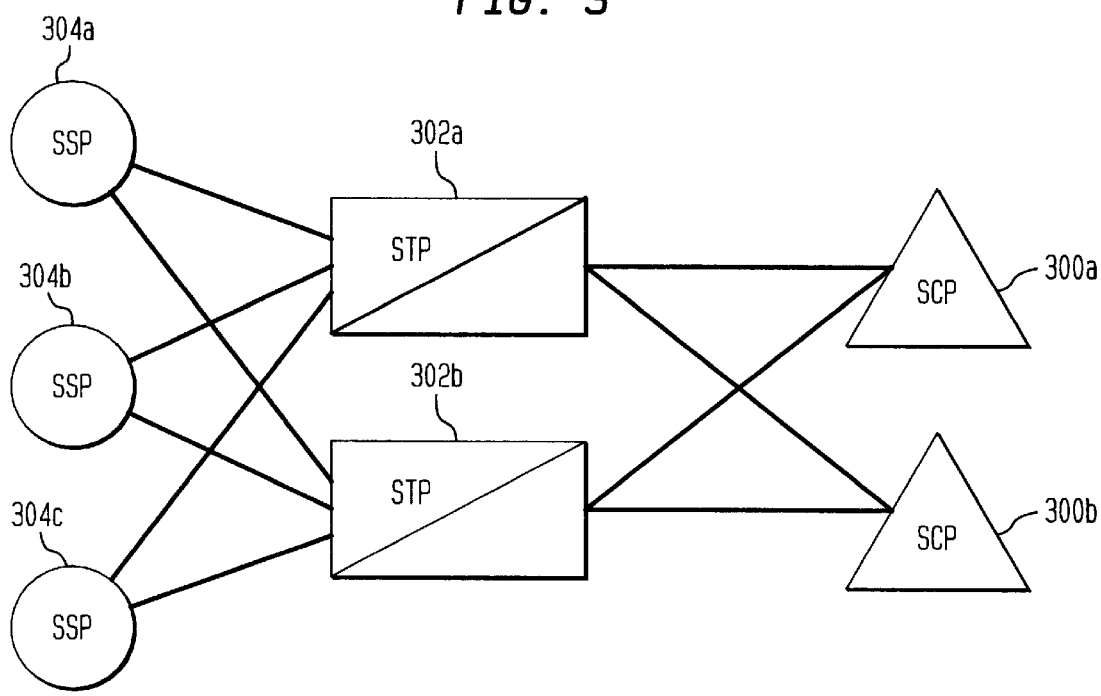
FIG. 3 is a block diagram of a network application using a service control point.

The present invention can also be implemented in intelligent networks, such as the Advanced Intelligent Network (AIN). FIG. 3 is a block diagram of an intelligent network. The intelligent network of FIG. 3 includes SCPs 300a and 300b (paired for reliability), signaling transfer points ("STPs") 302a and 302b (also paired for reliability), and service switching points ("SSPs") 304a–304n capable of common channel switching. The SCPs serve as network servers. One common application using SCPs as network servers includes the translation of "800" telephone numbers. For this translation, an SSP 304a–n receives dialed "800" numbers and launches a common channel signaling query to SCP 300a or 300b through STP 302a or 302b. SCP 300a or 300b processes this query, translates the received "800" number, and returns the translated number to the originating SSP.

Figure 4:
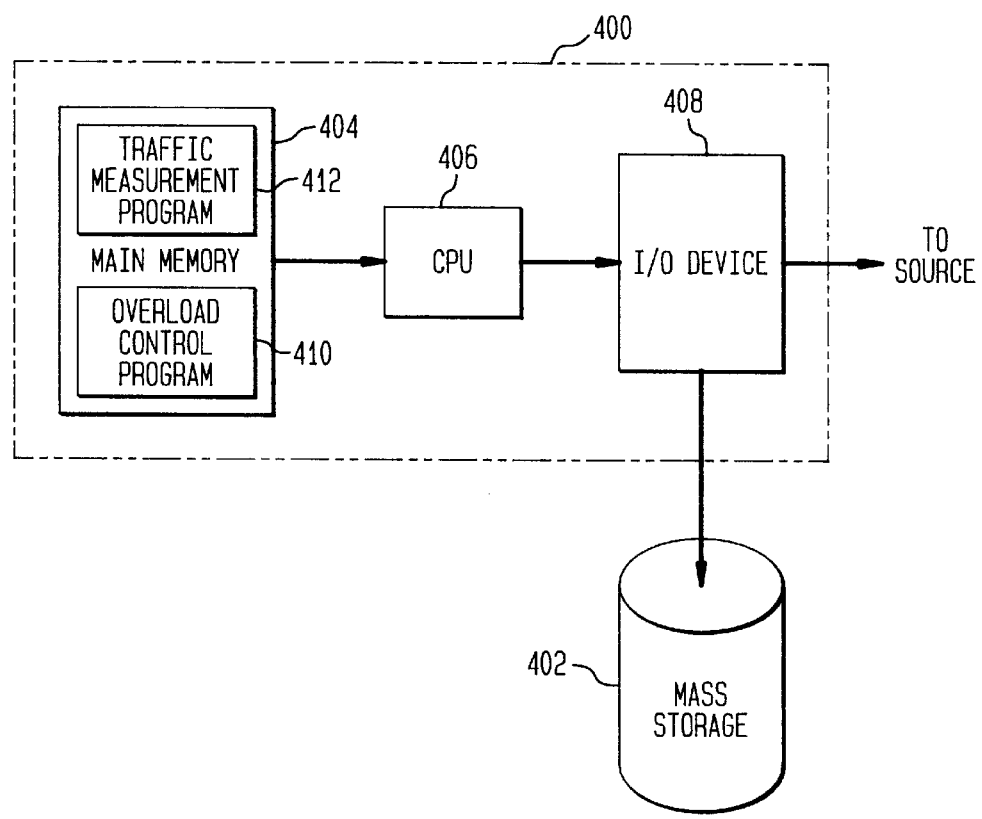
FIG. 4 is a block diagram of an apparatus for preventing network server overload in accordance with one embodiment of the present invention.

An embodiment of a controller according to the present invention is illustrated in the block diagram of FIG. 4. Controller 400 includes mass storage 402, main memory 404, central processing unit (CPU) 406, and input/output (I/O) device 408. Main memory 404 contains overload control program 410 implementing overload methods for the present invention. Main memory 404 also includes computer program code that computes traffic measurements 412 associated with overload control at specified intervals. CPU 406 executes the computer program load stored in main memory 404. Input/output device 408 handles the controller's access to mass storage 402 and serves as a gateway to network traffic resources.

Figure 5:
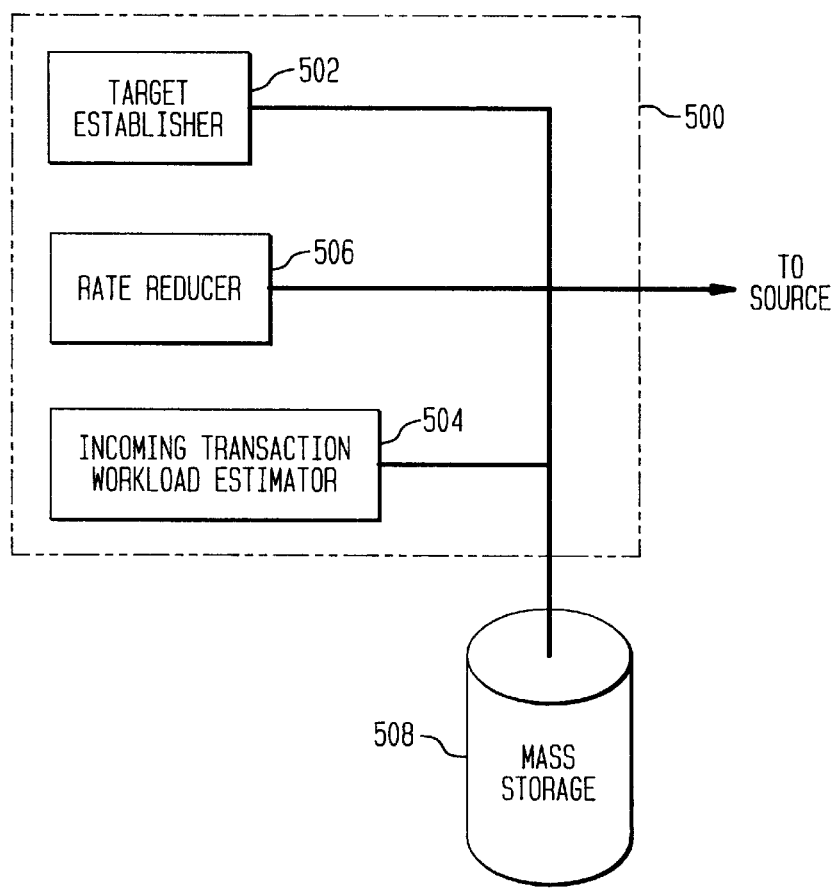
FIG. 5 is a block diagram of an apparatus for preventing network server overload in accordance with one embodiment of the present invention.

One of ordinary skill in the art will recognize that one or more of the functions performed by computer program code in controller 400 can be implemented in computer hardware such as microprocessors and integrated circuits. In one such alternative embodiment of a controller, illustrated in the block diagram of FIG. 5, controller 500 includes target establisher 502, incoming transaction workload estimator 504, and rate reducer 506. Controller 500 is connected to mass storage 508 in a network server. Target establisher 502 measures incoming server messages in each measurement interval and computes a target incoming transaction workload. From target establisher 502 measurements, incoming transaction workload estimator 504 estimates an incoming transaction workload offered by a source. Rate reducer 506 then reduces the rate at which new transactions are initiated by the source to match the incoming transaction workload when the offered transaction workload exceeds a threshold.

Figure 6:
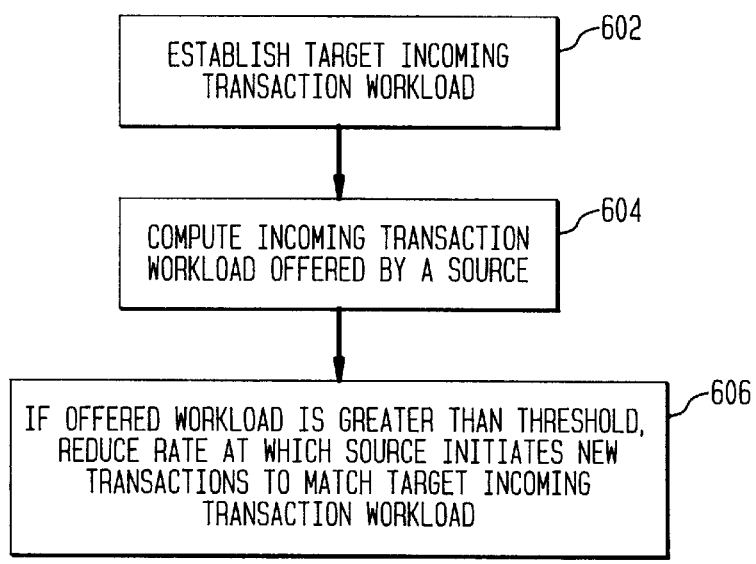
FIG. 6 is a flow diagram of a method for controlling server overload.

In accordance with the present invention an overload controller located in a network server or attached to a network server performs several tasks as illustrated by the flow diagram of FIG. 6. Preferably, an overload controller establishes a target incoming workload per measurement interval to be used during overload (step 602). Then, the overload controller computes the offered load of sources from measurements of arriving messages (step 604). Finally, when the offered workload is greater than the threshold reducing the new transaction rate from each source to match the incoming workload target (step 606). In accordance with the invention, steps 602 and 604 could be reversed.

In one embodiment, the target incoming workload may be determined and fixed ahead of time based on historical network traffic statistics. In an alternative embodiment, the controller can generate the target dynamically. For example, the value for the target incoming workload may be fixed at a level that provides a desired maximum fraction of time for the server to spend on transaction processing (i.e., the server capacity). In another example, a controller counts messages whose response times exceed a threshold and computes dynamically an appropriate target incoming workload from this count. The target incoming workload is expressed in terms of messages per second and represents a workload target when the transaction mix does not vary widely.

In accordance with the present invention, the output of a server overload controller is a computed value ("admission factor") representing the fraction of new transaction requests a source may send to the server during the coming measurement interval. The server communicates the admission factor to a source in response to new transactions from the source. It takes some time for the response message to reach the source and for the source to update the admission factor. If the controller allows a source to send the first message of a transaction, it also allows any network node to send subsequent messages corresponding to this transaction.

In one embodiment of the present invention, a controller controls the number of transactions transmitted to a network server by updating the admission factor at the end of a measurement interval and applying it to sources during the next measurement interval. Before an overload, the admission factor equals one (other values may also be used to detect overload conditions). A controller detects an overload and then modifies the admission factor during later measurement intervals for as long as the overload condition is detected or until the admission factor is less than one.

The following notation is used to describe the operation of the controllers of the present invention. It is assumed that each value identified below is measured at the end of a measurement interval ("the present interval") and measurements obtained during the present interval will be used to update the value of the admission factor for the next interval.

A' denotes the number of messages that arrived at the server in the present interval.

D denotes the number of dropped messages in the present interval.

F denotes the number of messages that finished service in the present interval.

ρ denotes the transaction-related processor utilization in the present interval.

C denotes the admission factor used in the present interval, where $0 \leq C \leq 1$.

Search-Type Controller

Figure 7:
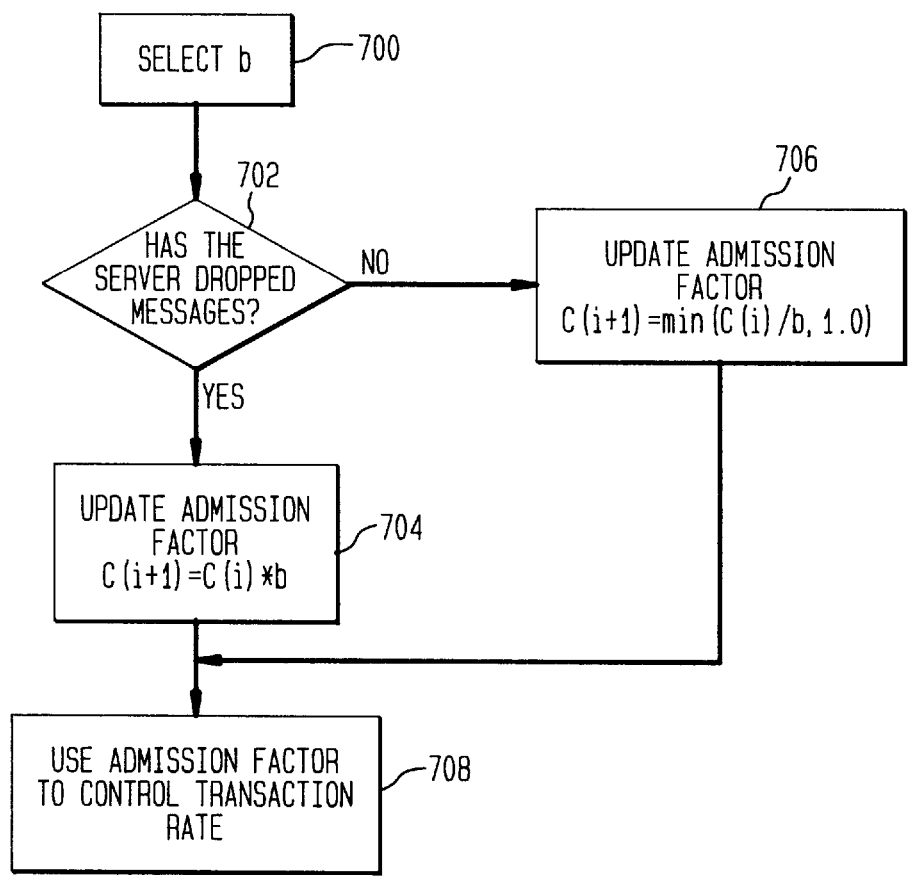
FIG. 7 is a flow diagram of a "search-type" overload control method according to one embodiment of the present invention.

In one embodiment of the present invention the overload controller is a "search-type" controller, i.e., the controller continually seeks to determine the maximum number of messages to admit to the server in a measurement interval. This embodiment of the controller, illustrated in the flow diagram of FIG. 7, uses a binary feedback scheme that lowers or raises C by a multiplicative factor b (selected at step 700) according to whether messages are or are not dropped in an interval.

The controller updates the admission factor C at the end of every measurement interval. The admission factor in the present interval is updated in one of two ways depending on the number of dropped messages D during the present interval. If a server drops messages during the present measurement interval (determined at step 702), then the admission factor for the next measurement interval is computed by multiplying the admission factor for the present interval by a constant b, a number preferably between zero and one (step 704). If no messages were dropped during the present measurement interval, the admission factor for the next interval is the lesser of either the admission factor for the present interval divided by b or one (step 706). The computed admission factor is used to control the rate at which transactions are initiated by sources (step 708). This computation of the admission factor for the next measurement interval is expressed in the following computer program code segment:

if (D>0)

C←C*b else

C←min(C/b, 1.0)

The assignment operator (the arrow ←) indicates that the value of C gets overwritten by the expression on the right. When C becomes too large, work arrives too quickly and the workload builds up until response times get so large that the server drops messages. Then, C becomes smaller, the server works off its backlog, and the cycle repeats.

Drop Type Controller

When feedback indicating whether a server is overloaded is infrequent relative to message interarrival times, convergence of admission factors to the values that prevent overload can be slow if search-type controllers are used. To compensate for slow feedback another embodiment of the present invention updates admission factors in one step using dropped messages.

Figure 8:
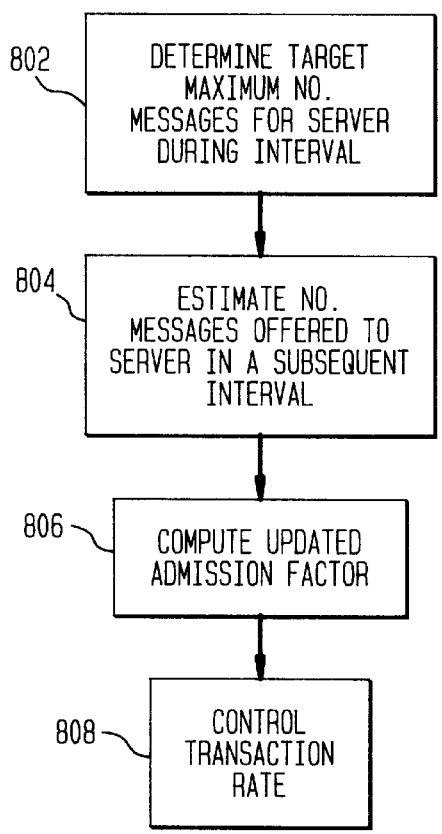
FIG. 8 is a flow diagram of a "drop-type" overload control method according to one embodiment of the present invention.

An embodiment of a drop-type controller follows the steps shown in the flow diagram of FIG. 8. The steps shown in FIG. 8 are executed at the end of each measurement interval. The controller discovers a surrogate for the target incoming workload per measurement interval (step 802). The surrogate is $A'_{max}$, the maximum number of messages the server should receive in a measurement interval. A new episode of overload is signaled by the dropping of messages. Once the server begins to drop messages, the difference between the number of messages it accepts and the number it drops in a measurement interval indicates the maximum acceptable workload in messages. Hence, $A'_{max}$ is initially set to this value.

The controller estimates the number of messages that will be offered in the next interval to be A=A'/C (step 804). At the end of the present interval, the controller updates the admission factor as follows (Step 806). If the server has dropped messages or if the admission factor is less than one, the admission factor is set equal to the lesser of either the admission factor for the present interval multiplied by the ratio of $A'_{max}$ to $A'$ for the present interval or one. If messages are dropped during the present interval, $A'_{max}$ for the next interval is the difference between the number of messages that arrived at the server during the present interval and the number of dropped messages during this interval. If there are no dropped messages, but the admission factor is still less than one, $A'_{max}$ remains unchanged. The following computer program code segment illustrates these steps:

$$\text{if } (D > 0 \text{ or } C < 1.0)\{$$
$$\text{if } (D > 0)$$
$$A'_{max} = A' - D;$$
$$C \leftarrow \left(\frac{A_{max}}{A}, 1.0\right) = \min\left(C\frac{A_{max}}{A'}, 1.0\right)$$
$$\}$$

Retaining the old value of $A'_{max}$ when no drops occur allows the admission factor to return to 1.0 when the overload subsides. If $A'_{max}$ were equal to the current number of incoming messages, the factor $A'_{max}/A'$ multiplying C would always be at most 1.0 and the admission factor could never grow back to 1.0. This controller also includes checks that denominators are not zero.

Drop-Type Controller with History

In a drop-type controller, the estimate $A'_{max} = A' - D$ can be inaccurate for at least two reasons. First, the server can buffer messages. In the interval when the server first drops messages, the difference between incoming and dropped messages can overestimate the correct number to admit, since some of the incoming messages are buffered instead of dropped. Second, messages dropped in one interval may have arrived in another. This is a significant factor causing the difference between incoming and dropped messages to underestimate the right number of messages to admit.

A more subtle limitation in drop controllers is that once the server stops dropping messages, the value of $A'_{max}$ stays fixed. Unfortunately, the message capacity of the server may not stay fixed. For example, if the average real time cost per message drops, the old value of $A'_{max}$ may be unnecessarily low.

An embodiment of the present invention accounting for the server message drop history fixes the problem of poorly chosen values of $A'_{max}$ by maintaining a history of the value $A'_{max}$ in a circular array having H elements. At the end of a measurement interval, the server overwrites the oldest member of the array with $A' - D$. If $D > 0$, the server sets $A'_{max}$ equal to the average of the values in the array. Otherwise, $A'_{max}$ remains unchanged. The new admission factor is set exactly as in a drop type controller. Defining $A'_{max}$ as an average over several measurements when the server drops messages addresses the variability in a single measurement.

Drop History Controller With Growth

In still another embodiment of the present invention, server control is based on the number of dropped messages and the potential to increase, or "grow," the target maximum number of messages that arrive for server processing during a time interval. This embodiment of the server controller is the same as a drop history controller except that it updates $A'_{max}$ according to the rule $A'_{max} \leftarrow \max(A'_{max}, A')$, when $D=0$. In intervals when the server does not drop messages but the admission factor is still less than 1.0, this rule takes advantages of random fluctuations in the number of messages arriving to the server to explore whether the server actually can accept more messages per interval than $A'_{max}$.

In this way, the limit $A'_{max}$ is raised until the server again drops messages, at which time, its growth may be halted.

Usage Controller

Figure 9:
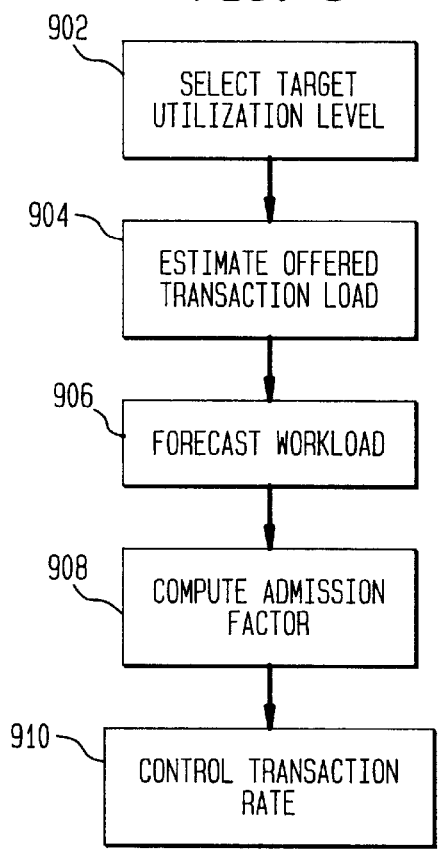
FIG. 9 is a flow diagram of a "usage" overload control method according to one embodiment of the present invention.

In another embodiment of the present invention, the controller monitors server processor utilization instead of dropped messages. In certain applications, usage controllers provide an advantage over the drop type controllers because they need not translate the server processing capacity into messages per unit time. This embodiment follows the steps illustrated in the flow diagram of FIG. 9.

The controller selects T, the target utilization level for transaction processing during overload (step 902). For example, a server operator may not want the transaction-related processor utilization to go above 92%. The operator may also want to build in a safety margin and therefore set T to represent a maximum value less than 0.92, like 0.90. The maximum incoming transaction workload per measurement interval is then given by TI, where I is the duration of the measurement interval.

The usage controller updates the admission factor from the present interval to the next interval as follows. First the controller infers the offered transaction load in the next interval as follows. The average processing time per message in the present interval is $\rho$ I/F; thus the arriving workload in that interval may be estimated as $A' \rho$ I/F (step 904). Since this quantity represents approximately C times the offered workload, an estimate of the offered workload is computed according to the expression $W = A' \rho$ I/(FC). The controller subsequently forecasts the offered workload in the next interval to be equal to the offered workload in the present interval (step 906). Then W is the offered workload forecast for the next interval.

At the end of the present measurement interval the controller computes an updated admission factor according to the following expression (step 908):

$$\text{if } (\rho > T \text{ or } C < 1.0)$$
$$C \leftarrow \min(TI/W, 1.0) = \min\left(C\frac{F}{A'} \frac{T}{\rho}, 1.0\right)$$

Before an overload, C typically is equal to 1.0, so the test $\rho > T$ detects an overload. Once admission factors have been applied, the same test typically fails, so the second test $C < 1.0$ prevents controls from being removed abruptly and gradually raises C back to 1.0 when the overload subsides. The computed admission factor is used by the controller to control the transaction rate (step 910).

Fair Share Controllers

In an environment where a single network server provides multiple services, a controller must not only reduce the load coming to the server to the maximum level it can handle during overloads, the controller must also block excessive demands for services individually. For example, if a sudden increase in the demand for one service overloads the server (a focused overload occurs), the network operator might want to cut back traffic directed to the service causing the overload, but not traffic of other services. On the other hand, in a general overload (the loads of all services increase), the controller could cut back all traffic in proportion to demand.

In general, a controller in a multiservice environment must allocate "fair shares" of the server capacity to competing services. An embodiment of a fair share controller executes the algorithm below at the end of each measurement interval:

```
if (server is overloaded or control was active in current measurement
interval){
    for each service determine fair share [service];
    for each service {
        if (demand[service] > fair_share[service]) accept at most
        fair_share[servicej;
        else accept demand[service];
    }
}
```

Several aspects of the algorithm deserve further elaboration. First, the initial if statement both activates and removes controls. Assuming the server is initially not overloaded, it activates overload controls when the server becomes overloaded. Once controls are active, the measurements that detected an overload may (and should, if the control effectively reduces traffic) indicate that the server is no longer overloaded. However, the demand may still be too high. The algorithm continues to estimate demand as long as controls are active. Otherwise, controls might be removed abruptly, resulting in oscillations in and out of overload.

The array fair_share specifies how much processing capacity the server allocates to each service in the coming measurement interval. The fair share is not necessarily the maximum amount of processing the service could consume; if a service's demand is less than the available capacity server processing capacity may be allocated to another service. The sum of all the fair shares must be less than the server capacity, as the sum is generally what the services are expected to use.

Controls that dynamically compute the share of server processing capacity for each service typically require information about all services at once. Revenue-based controls might well have the same property if priorities are not absolute (i.e., do not shut off one service completely before cutting back a higher priority service).

In general, the calculation of fair share could involve table lookups if priorities are static or comparisons of measurements under more dynamic allocation algorithms. Since the resource allocated is processing capacity, fair share must ultimately be converted into units of time or processor utilization.

The quantity demand refers to the workload the sources offer. Since some of this offered load may be blocked at the sources by a controller, the server infers the offered load from internal measurements and prior admission factors.

Both usage and drop controllers can be modified to produce fair share controllers for servers providing multiple services. In the case where a server provides multiple services, the notation describing controller operation must be modified as follows:

A'(s) denotes the number of messages of service s that arrived at the server in the current interval. A'=ΣA'(s) is the number of messages from all services. Omitting an argument from a measurement represents the sum over all services.

C(s) is the admission factor for service s (i.e., the admission factor that all sources belonging to service s use) for the current method. $0 \leq C(s) \leq 1$.

D(s) denotes the number of messages the server dropped in the current interval.

$A'_{max}(s)$ is the maximum number of messages the server should accept from service s in the coming measurement interval.

F(s) denotes the number of messages of service s that finished service in the current interval.

ρ(s) denotes the processor utilization due to processing of service s work in the current interval.

T(s) denotes the target transaction-related utilization level for service s work in the next interval.

A fair share drop controller uses counts of dropped and arriving messages to detect overload and estimate demand including the history and growth modifications. An embodiment of a drop controller method that enforces fair shares for different services provided by the computer's process scheduler includes the steps of the following algorithm:

if ($D(s) > 0$ or min $C(s) < 1.0$) {

$$\text{if } (D(s) > 0) A'_{max}(s) = \frac{1}{H} \sum_{i=o}^{H-1} A'_i(s) - D_i(s)$$

$$\text{else } A'_{max}(s) \leftarrow \max(A'_{max}(s), A'(s));$$

$$C(s) \leftarrow \min\left( C(s) \frac{A'_{max}(s)}{A'(s)}, 1.0 \right)$$

}

{

The subscript i indexes measurement intervals, with 0 denoting the current one and higher numbers denoting intervals further in the past.

The inside "if" statement in the algorithm computes the fair share for processes that are dropping messages. The else statement raises the share once the service stops overloading the server. As in a usage controller, the min function serves to accept the smaller of the service's demand and the service's fair share.

Figure 10:
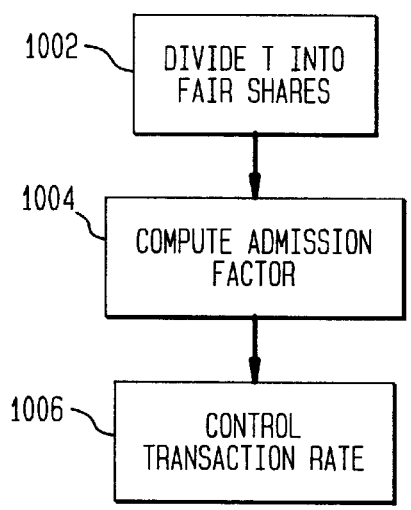
FIG. 10 is a flow diagram of a "fair share" overload control method according to one embodiment of the present invention.

During an overload, a fair share usage controller reduces incoming traffic until the server utilization is at the overall target T. In addition, a fair share usage controller is designed to reduce traffic from each service in proportion to how much the service's demand exceeds its recent usage. For example, if only one service is causing the overload, then a fair share controller cuts back traffic directed to that one service, without affecting other services. An embodiment of a fair share controller follows steps illustrated in the flow diagram of FIG. 10 when there is an overload. The controller divides up the target T into "fair shares" for the services on the server in proportion to the loads they offered before the overload (step 1002). Next, it sets the admission factor for each service (step 1004) to reduce the service's workload to the service's fair share (step 1006).

The fair share or target for service s is defined as follows: if U(s) is an estimate of the utilization of service s prior to the overload and U=ΣU(s), then $$T(s) = \frac{U(s)}{U} T$$

U(s) is computed by averaging service utilization measurements over a number H of past measurement intervals. That is, if $\rho_i(s)$, i=0, ..., H−1, are the last H measurements of service s's utilization, then $$U(s) = \frac{1}{H} \sum_{i=0}^{H-1} \rho_i(s)$$

At the end of each measurement interval, a fair share controller updates the circular arrays of utilization histories for each service. Then it updates the admission factors for each service:

if (ρ>T or min C(s)<1.0)

$$C(s) \leftarrow \min\left(\frac{T(s)I}{W(s)}, 1.0\right) = \min\left(C(s)\frac{F(s)}{A'(s)} \frac{T(s)}{\rho(s)}, 1.0\right)$$

A usage type controller keeps processor utilization at a safe, target level while maintaining maximum transaction throughput. A fair share usage controller achieves these objectives and it controls an overload by cutting back traffic from the service causing the overload and allowing the server to continue processing nearly all the traffic other services offer. There is latitude in a fair share controller to give services priorities, e.g. by multiplying the fair shares T(s) by weights. In one embodiment of the invention, these weights correspond to service revenue requirements.

Overload Controller Compensating for Server Process Scheduling

Another embodiment of the present invention is suited for an environment where the servers offer multiple services whose demand is likely to be volatile, where at any time, demand for one of the services could increase and push the total load beyond what the server can handle. In such an event, the server must decrease the amount of traffic it accepts. A server controller must choose which traffic to accept and which to reject. Server controllers determine how much of the server processing capacity to allocate to competing services when the total demand exceeds the server capacity and limit the incoming demand of those services to their allocations.

Allocation questions such as these also fall within the domain of the operating system's process scheduler. When different processes handle different services, the process scheduler prioritizes competing services because it determines when and for how long each process runs. The overload controller also assigns services priorities because it governs how much work of each type gets admitted to the server. Overload controllers designed according to the present embodiment recognize and deal with these overlapping priority assignments.

Controllers designed according to the present invention compensate for the interaction of server overload controls and process scheduling. In an environment where a server has a scheduler implemented in the UNIX operating system, the UNIX scheduler gives different processes time slices in a round robin fashion.

A process may use part or all of its time slice, which roughly translates into a guaranteed share of processing capacity per process. Other processes may, in effect use the portion of the time slice that a given process does not need, thereby taking more than their guaranteed share of real time.

Typically a server has a single, multitasking processor; however, the present invention also has application in a multiprocessor environment. There are typically two types of processes controlled by an operating system, transaction handling processes and overhead processes. There is a one-to-one correspondence between transaction-handling processes and services. The overhead process represents all the other tasks the server processor must perform including operating system chores, maintenance, measurements, and the overload control itself.

Preferred embodiments of the fair share usage controller can be modified to handle interaction with server process scheduling. A usage controller is designed to create fire walls between services when one service's demand suddenly increases while the other services' demands remain roughly constant. A usage controller allocates server processing capacity to services roughly in proportion to their recent usage levels. The intent is to give those services not responsible for the overload as much server processing capacity as they have recently been using and to cut back traffic from the offending service.

To deal with processes other than transactions, in this embodiment, when the total measured utilization ρ exceeds $\rho_{max}$, where $\rho_{max}$ is a predetermined total utilization threshold, the server control is activated. The symbol $\rho_{ovhd}$ represents the processor utilization due to overhead processes in the current interval, i.e. $\rho_{ovhd} = \rho - \Sigma\rho(s)$.

Figure 11:
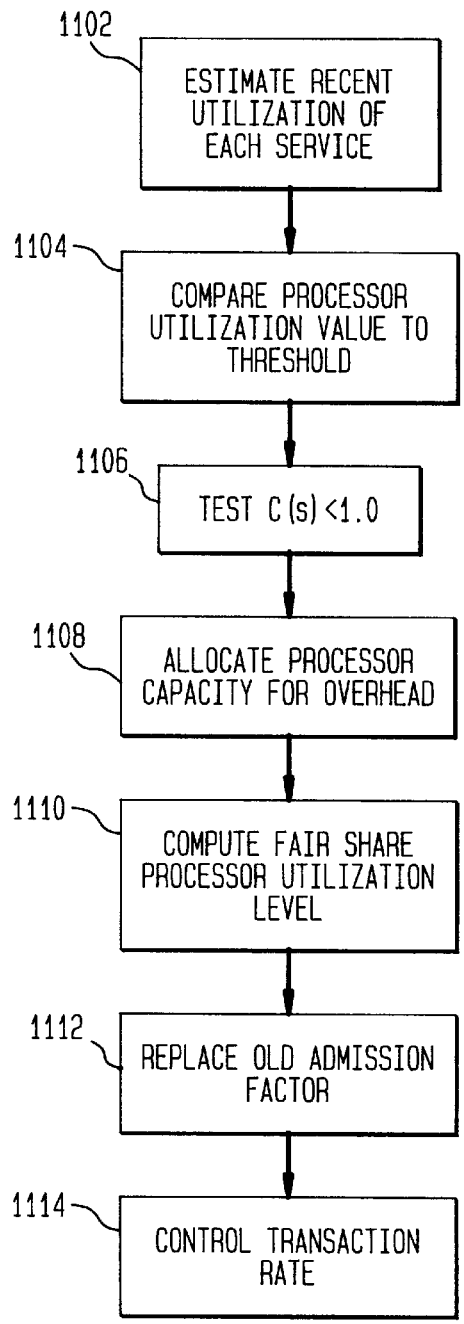
FIG. 11 is a flow diagram of an overload control method for reducing operating system conflicts according to one embodiment of the present invention.

One embodiment of a server overload controller that reduces operating systems conflicts includes the steps shown in the flow diagram of FIG. 11. The overload controller estimates the recent processor utilization of each service (step 1102). Next the controller compares the processor utilization valve to a threshold (step 1104) and tests C(s) to determine if it is less than 1.0 (step 1106). The controller subsequently allocates an amount of processor capacity for overhead processing (step 1108), computes a fair share processor utilization level for the service using equations introduced below (step 1110), and replaces the computed admission factor with a newly computed admission factor, computed using the fair share processor utilization level (step 1112). The newly computed admission factor is used to control the number of messages processed by the network server (step 1114).

To define the fair share of a services, denoted here by T(s), let $\rho_i(s), i=0, \ldots, H-1$, be the last H measurements of service s's utilization (0 indexes the current interval and the subscripts increase with age), and define:

$$U(s) = \frac{1}{H} \sum_{i=0}^{H-1} \rho_i(s)$$

U(s) estimates the utilization of service s prior to the overload. Set $U = \Sigma U(s)$. At the end of each measurement interval and prior to the algorithm below, the server updates each U(s). Then the server executes the following algorithm:

if (ρ > $\rho_{max}$ or min C(s) < 1.0)

for each s{

$$T(s) = \frac{U(s)}{U} (\rho_{max} - \rho_{ovhd})$$

$$C(s) \leftarrow \min\left(c(s) \frac{F(s)T(s)}{A'(s)\rho(s)}, 1.0\right)$$

}

The use of the difference ($\rho_{max} - \rho_{ovhd}$) in the fair share assignment effectively allocates overhead the same amount of processor capacity in the next interval as it used in the current one.

The fair share T(s) of service s depends on all services through the sum U; it also depends upon overhead processes through ($\rho_{max} - \rho_{ovhd}$) Consequently, the fair shares of all services are calculated jointly. The min function sets the new admission factor to accept all of service s's demand if the demand is forecast to be less than the amount T(s)I of time the processor can devote to service s. Otherwise it sets the admission factor to accept only T(s)I seconds of work from service s which is its fair share.

Adaptive Gapping

The preceding discussion did not specify how sources should implement admission factors because determining and implementing admission factors are separate, independent operations. One possible implementation of admission factors is by percent-blocking, in which the source chooses at random a specified fraction of new transactions for admission. The table-driven code gapping approach is another method of implementing admission factors.

The present invention prefereably uses automatic code gapping to admit new transaction requests. The gap intervals are adaptively recalculated, based on the admission factor, each time that the SCP tells its source that its congestion level has changed.

In response to a request from a server to reduce the number of new transactions transmitted to the server by the admission factor C, the source measures its input transaction rate, $\lambda$, and calculates its new gap interval, $g_{new}$, as:

$$g_{new}=(C\lambda)^{-1}-\lambda^{-1}.$$

Similarly, in response to a request from a server to increase the number of new transactions transmitted to the server by the admission factor C, the source measures its input transaction rate, $\lambda$, and calculates its new gap interval, using this same expression.

Although the above-described calculations were performed at the source, this adaptive gap technique may alternatively be performed at the server level. The main difference between calculating the new gap interval, $g_{new}$, at the server rather than the source is that the server does not know, and cannot directly measure $\lambda$. According to the present invention, however, the server infers $\lambda$ based on the source's output transaction rate, $\lambda_{out}$. In particular, the server measures $\lambda_{out}$ and then estimates $\lambda$ as:

$$\lambda^{-1}=(\lambda_{out})^{-1}-g_{old},$$

where $g_{old}$ is the present gap interval. Having estimated $\lambda$, the server calculates $g_{new}$ using the same method as the source. Finally, the server transmits the new gap interval to the source.

Note that the adaptive code gapping algorithm could be used in sources in combination with the admission factor algorithms described above or with any algorithm the server uses to set admission factors. Similarly, if the server uses one of the admission factor algorithms described above, a source can send to the server the fraction of transactions specified by the admission factor using any method of blocking transactions the source chooses.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. A method for preventing overload of a network server by adaptively modifying a gap interval that is used by a source to limit the number of transactions transmitted from the source to a network server, said method comprising the steps of:

determining the source input transaction rate;

calculating a new gap interval based on the determined transaction rate and an admission factor received from the server; and blocking transaction requests input to the source based on the new gap interval at the source.

2. The method of claim 1 wherein said determining step comprises measuring the source input transaction rate at the source and said calculating step is performed at the source.

3. The method of claim 1 wherein said determining step comprises estimating the source input transaction rate at the server based upon an old gap interval and said calculating step is performed at the server, said method further comprising the step of the server transmitting the new gap interval to the source.

4. A method of adaptively modifying a gap interval that is used by a source to limit the number of transactions transmitted from the source to a service control point comprising the steps of:

determining the source output transaction rate for transactions sent from the source to the service control point;

calculating an estimated source input transaction rate by subtracting an old gap interval from the determined source output transaction rate;

calculating at the service control point a new gap interval based on the calculated estimated source input rate and a predetermined admission factor;

transmitting the calculated new gap interval from the service control point to the source; and blocking transaction requests input to the source using the new gap interval at the source.

* * * * *